March 9, 1954
M. G. ANDERSEN
2,671,504
AIR-ATOMIZATION DEVICE AND BURNER
ARRANGEMENT FOR LIQUID FUEL
Filed June 9, 1947
6 Sheets-Sheet 1
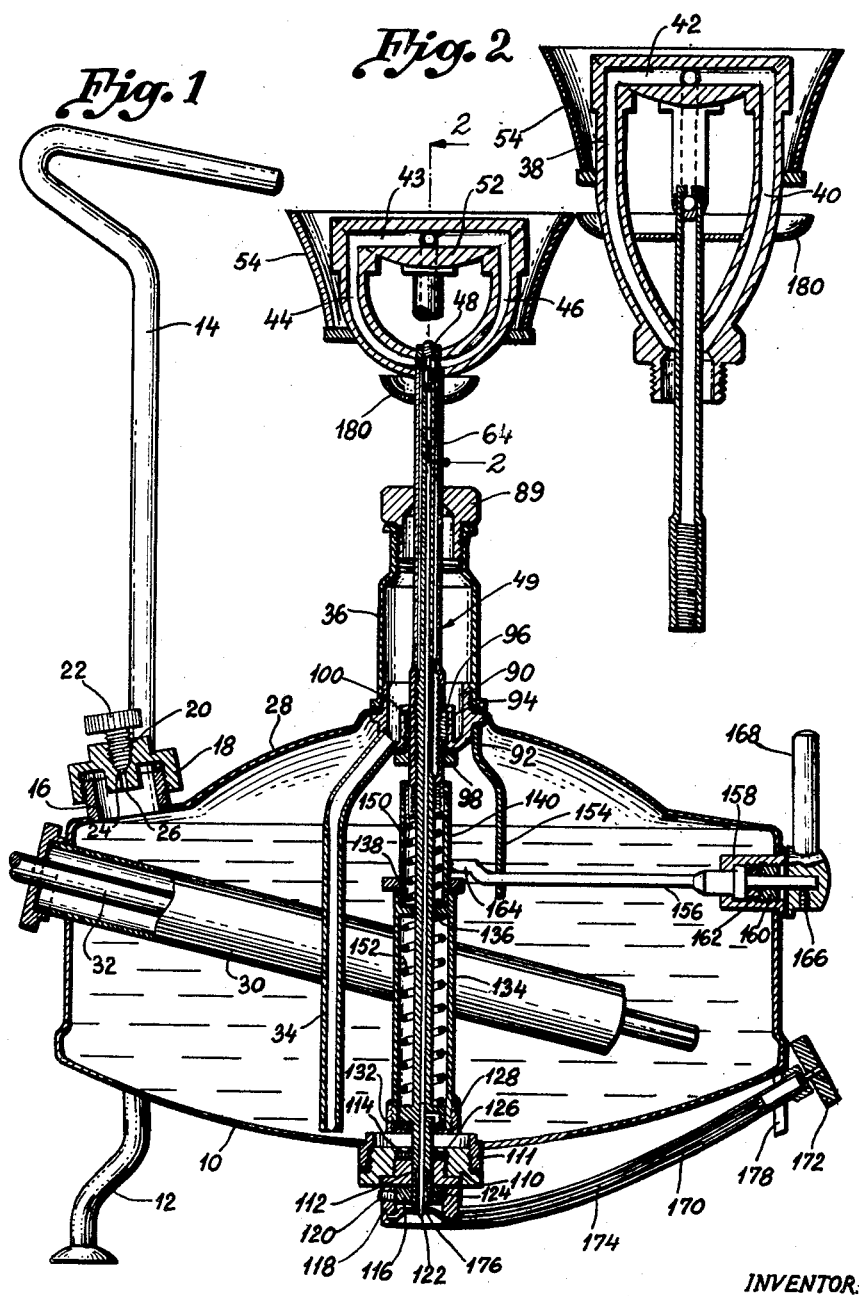
INVENTOR:
Martin Georg Andersen,
BY
Ernest A. Marmorek,
His Agent.

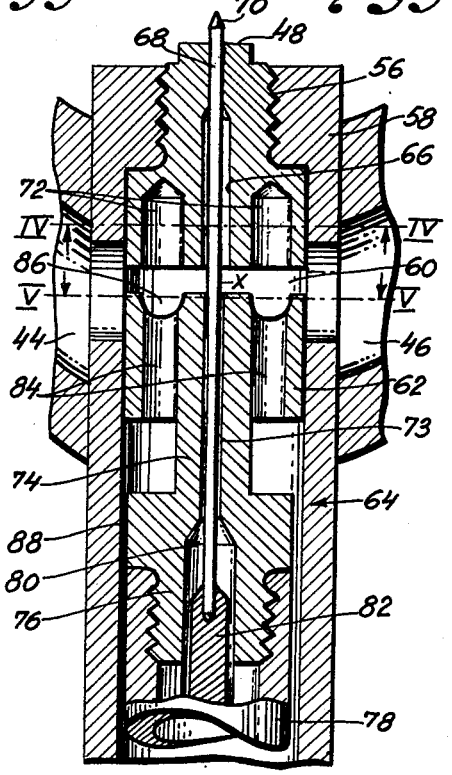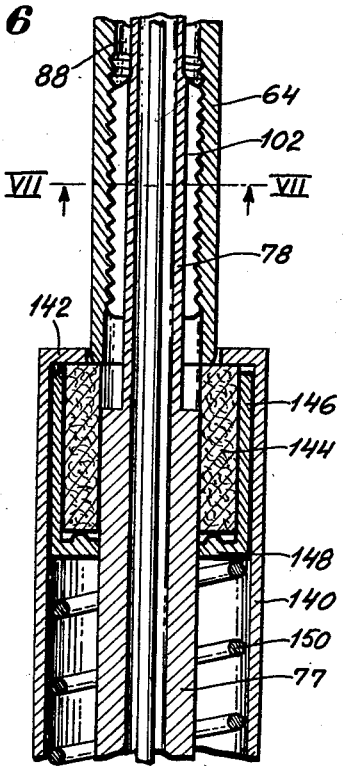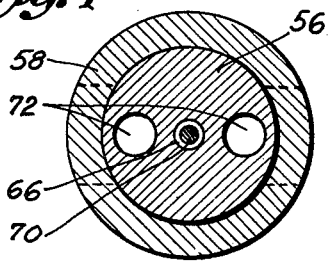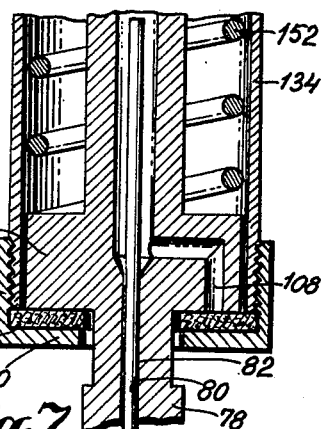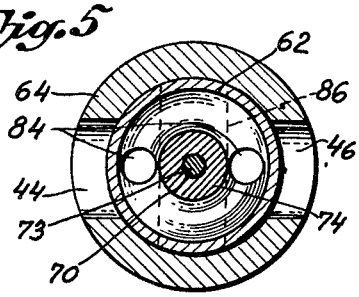

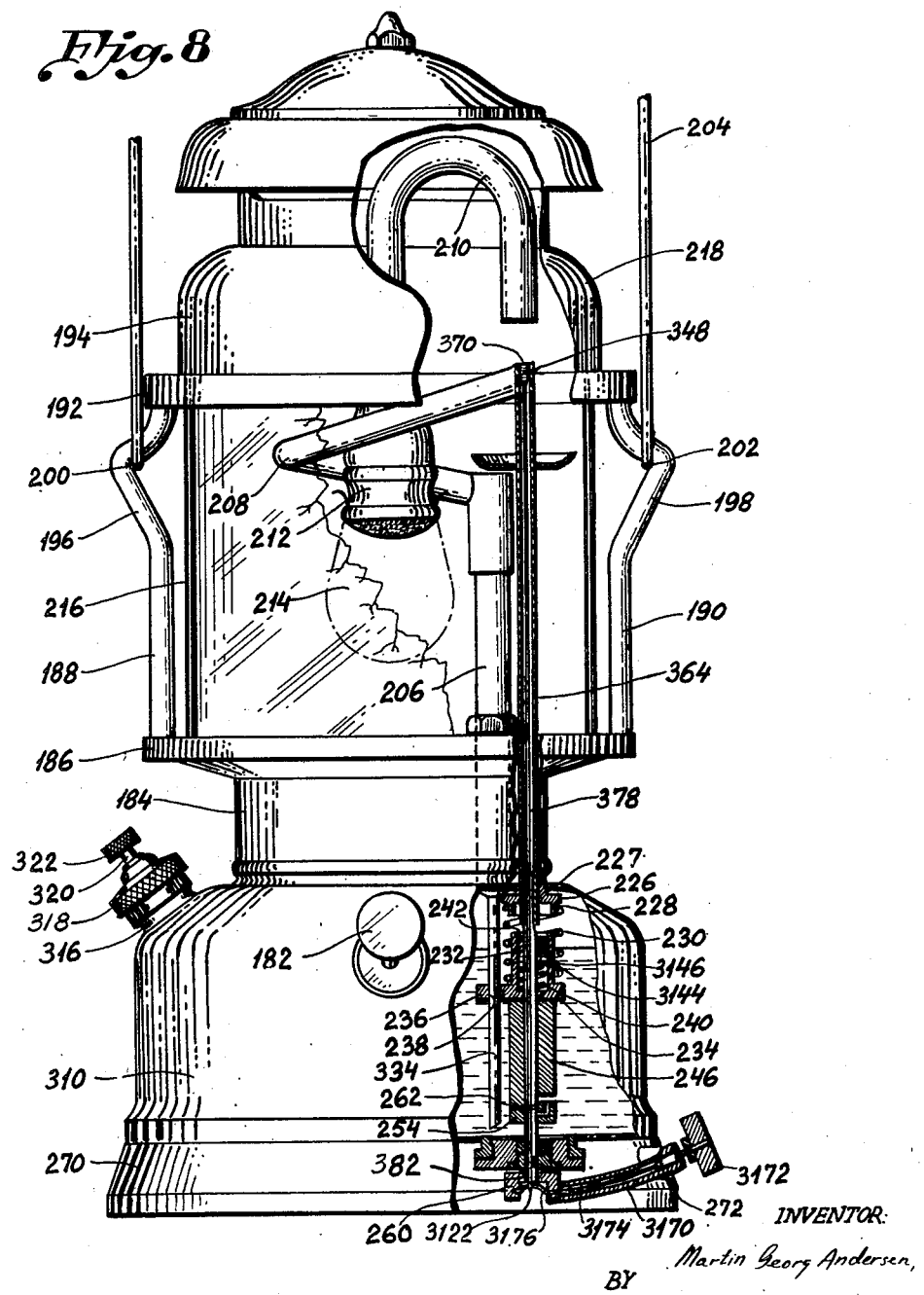

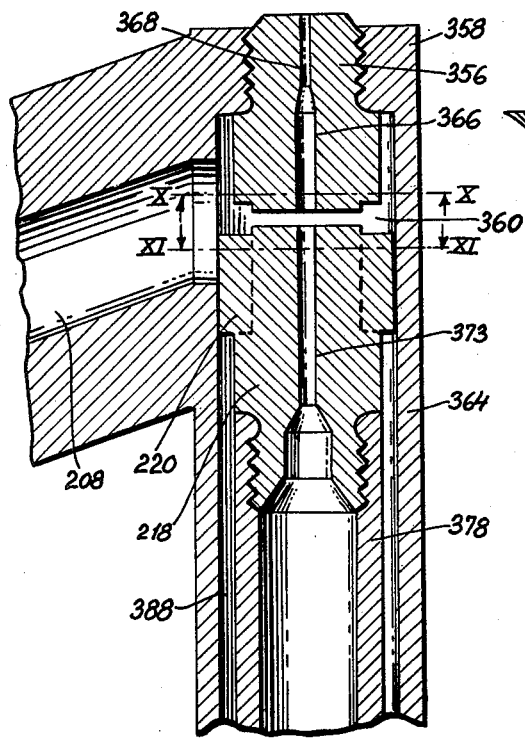
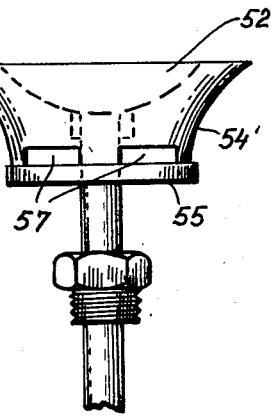
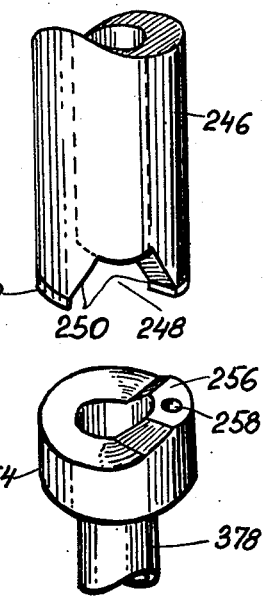
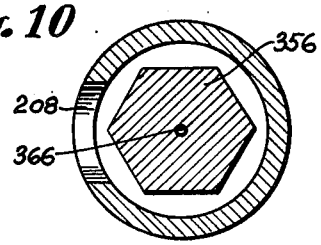
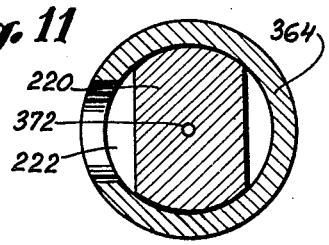

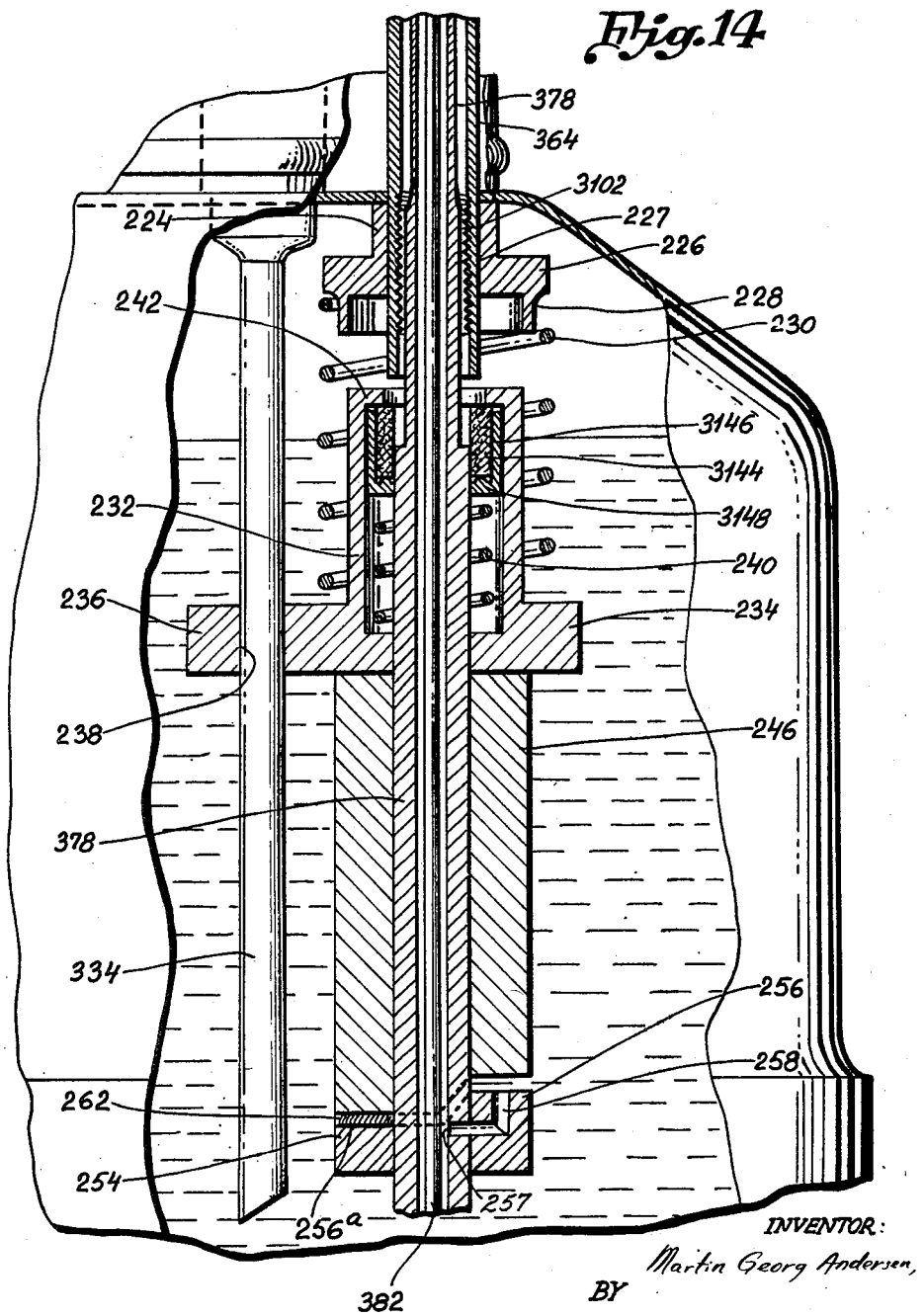

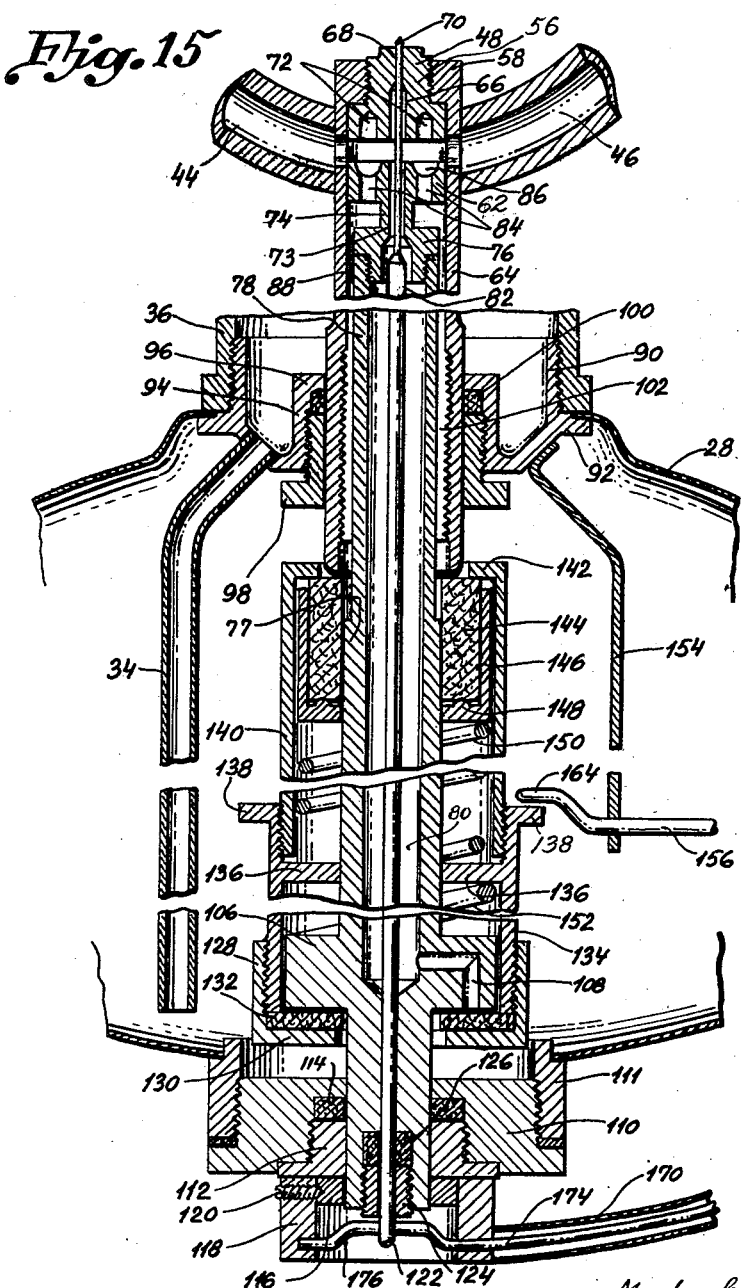

Patented Mar. 9, 1954

2,671,504

UNITED STATES PATENT OFFICE 2,671,504

AIR-ATOMIZATION DEVICE AND BURNER ARRANGEMENT FOR LIQUID FUEL

Martin Georg Andersen, Copenhagen, Denmark

Application June 9, 1947, Serial No. 753,435

19 Claims. (Cl. 158—81)

This invention relates to a novel and improved device for air-atomization of liquids, either for pre-heating kerosene stoves, or like apparatus, during starting thereof, or for other purposes requiring combustion of air-atomized liquid fuel at high temperatures.

One object of the invention is to provide for a simple adjustable air-atomization of liquid fuel in order to produce a flame having a variable content of liquid fuel relatively to its contents of air, so that the combustible mixture will be easily inflammable at a relative great fuel-content, and so that the mixing ratio can be varied for producing a flame of variable temperature.

In this connection it is also an object of the invention to provide for a construction of such atomizer which is simple and inexpensive and the parts of which can be easily made in mass production.

Another object of the invention is to provide an atomizer having such operating means that adjustment and handling of the device will be as simple as possible.

Still another object of the invention is to provide a device for heating, lighting or cooking purposes including an atomizer for pre-heating the device and adapted to produce a flame of high temperature.

Still another object of the invention is to provide a device for heating, lighting or cooking purposes including a gasification burner for liquid fuel and an atomizer burner for pre-heating such gasification burner, the two burners having a common nozzle. In this connection it is a further object of the invention to provide a simple means for shutting off the atomizer burner and turning on the gasification burner in one operation.

Still another object of the invention is to provide a heating, lighting or cooking device of the kind specified having a single adjusting handle for shutting off the atomizer burner and turning on the gasification burner, and vice versa, and for regulating the flame of either.

In order to achieve these and other objects, which will become apparent as this specification proceeds, the invention comprises the features and combination of parts set forth hereinafter and specifically stated in the appended claims.

In the drawing:

Fig. 1 is a vertical sectional view of a kerosene stove in accordance with the invention, Fig. 2 is a sectional view of the burner of the stove, taken at right angles to the section in Fig. 1, taken on line 2—2 of Fig. 1, Fig. 3 is an enlarged sectional view of the burner nozzle of the device, Figures 4 and 5 are sections taken along the lines IV—IV and V—V, respectively, in Fig. 3, Fig. 6 is an enlarged section of the liquid riser pipe and the air supply pipe of the device, Fig. 7 is a sectional view taken along the line VII—VII in Fig. 6, Fig. 8 is a side elevational view, partly in section of a lighting device in accordance with this invention, Fig. 9 is a fragmentary sectional view that shows a modification of the construction shown in Fig. 3, Fig. 10 is a sectional view taken along the line X—X in Fig. 9, Fig. 11 is a sectional view taken along the line XI—XI in Fig. 9, Fig. 12 is a perspective view of the lower portion of the liquid riser pipe of the device shown in Fig. 8, and Fig. 13 is a fragmentary elevational view that shows a modification of the upper portion of the device shown in Fig. 1, Figure 14 is an enlarged section of the principal working parts of the modification shown in Figure 8, Fig. 15 is a fragmentary sectional view showing the assembly of the conduit parts of the embodiment shown in Fig. 1.

The kerosene stove shown in Fig. 1 comprises a fuel tank 10 standing on a plurality of legs 12, of which only one is shown in Fig. 1, and having a plurality of supports 14, of which only one is shown, for a cooking pot. The tank is provided at its upper side with a filler pipe 16 formed with an external thread on which is threaded a cap 18. The cap is provided with a screw-threaded hole for receiving a screw plug 20 having a knurled head 22 so that the plug can be manually screwed against a conical seating 24 in the cap 18 so as to close a narrow vent 26 therein. The tank is in the usual manner filled with kerosene till about the level indicated in Fig. 1, so that there will be an air-filled space within the dome-shaped upper side 28 of the tank and the liquid level. Within this space, a pressure above that of the atmosphere for causing the liquid fuel to flow out through a vaporizer and a nozzle, can be produced in the usual manner by means of a pump 30, the construction of which is not shown in detail, and which comprises a piston rod 32 adapted to be manually operated by means of a handle (not shown).

It will be understood that even if the stove is shown as being of the so called upright type, the features described hereinafter may also be applied to kerosene stoves, or like apparatuses, of any other convenient external shape.

A liquid riser pipe 34 extends from near the bottom of the fuel tank 10 into a tubular liquid compartment 36 above the fuel tank which opens into two rising channels or branches 38 and 40 of a vaporizer which also has an annular horizontal portion 42 which through a pair of descending vaporizer channels or pipes 44 and 46 are connected with a nozzle 48 through which the vaporized kerosene flowing through the vaporizer channels 38—46, intensely heated during operation, is expelled so as to burn in the form of an annular flame between a bowl-formed baffle 52 provided under the annular horizontal portion 42 of the vaporizer and an annular baffle 54 fixed to the rising branches 38, 40 and the descending pipes 44, 46.

While kerosene stoves of the type described hereinbefore are normally started by heating the vaporizer pipes in any convenient manner such as by burning alcohol in a small bowl arranged under the burner, or by means of a separate preheater through which kerosene which may be taken from the tank of the stove is atomized so as to be inflammable, the apparatus shown in the drawing is adapted to be started by means of a preheater generally indicated at 49 combined with the vaporizer nozzle 48; said preheater 49 comprises an air conduit, as explained further below. Hereby the ignition and heating of the apparatus and the change to normal operation becomes easier, simpler and more effective than heretofore since only one nozzle is provided which is common to the preheating atomizer and the vaporizer. Where here and in the following the word "atomizer" is used, this should be understood as comprising a system of conduits for liquid fuel and air extending through the nozzle of an apparatus and serving the purpose of propelling a finely atomized spray of fuel to be ignited in the initial state of the lighting of the apparatus to produce a preheater-flame for preheating the vaporizer.

To this end the vaporizer pipes 44 and 46 do not open immediately into the nozzle 48. The nozzle comprises, as shown in Fig. 3, a plug 56 one end of which is screw-threaded and screwed into a cylindrical member 58 fitted into the upper portion of a bore at the point where the pipes 44 and 46 meet. The member 58 constitutes the upper end of a pipe 64 in which a plug 62 with an annular groove 86 in its upper face is slidably mounted beneath the plug 56 so as to define an annular space 60 between the two plugs into which space the pipes 44 and 46 open. The plug 56 has a central bore 66 the upper end 68 of which is restricted to a diameter which is only a few hundredths of a millimeter greater than that of a needle 70 which, as described hereinafter, is adapted to be moved up and down through the nozzle to act both as cleaning needle and as a means to vary the flame during operation. The plug 56 is on its lower face formed with recesses 72 for receiving the pins of a special wrench by means of which the plug is screwed into the member 58. The length of the restricted portion 68 of the bore 66 is relatively small, preferably only 1 or 2 millimeters. The portion 68 constitutes the outlet or discharge passage for the nozzle 48.

The plug 62 has a bore 73 in alignment with the bore 66, and extends with an intermediate restricted portion 74 through the pipe 64 and is with its lower screw-threaded portion 76 screwed into the upper end of a pipe 78. The lower portion 76 of the plug 62 has an enlarged bore 80 for receiving a spindle 82 extending through the whole length of the pipe 78 and carrying the needle 70 at its upper end.

Two or more bores or passages 84, Figures 3 and 5, extend longitudinally through the upper portion of the plug 62 and open into the annular groove 86 in the upper face of the plug. While the diameter of the upper portion of the plug 62 is of a size very near that of the inner diameter of the pipe 64, the diameter of the lower portion of the plug and the outer diameter of the pipe 78 are somewhat smaller than the inner diameter of the pipe 64 so that an annulus 88 is formed between the two pipes which through the bores 84 of the plug 62 opens into the space 60 where the vaporizer channels 44 and 46 and the nozzle bore 66 meet.

The pipe 64 thus forms part of the air conduit for the atomizer in which the tube 78 forms part of the liquid conduit. The nozzle outlet 68 is a common outlet for the atomizer liquid and air conduits, which are intersecting in the point X (Fig. 3), with the annular space 60 forming the remote portion of the air conduit where it intersects the liquid conduit. It will thus be understood that this atomizer, the advantages and operation of which will be described more fully hereinafter can be designated an intersection type atomizer, which abbreviated term hereafter will be used.

The pipe 64 extends through the tubular liquid compartment 36 which is closed at its upper end by means of a plug 89 which with an external thread is screwed into the mouth of the compartment and which is provided with an axial bore through which the pipe 64 extends and which is sealed against the pipe, such as by soldering, welding or in any other convenient manner.

The liquid compartment 36 is formed by a tubular member which is screwed and soldered to an upturned flange 90 of a plug 92 fitted into an aperture in the tank 10. The plug 92 is formed with an upturned inner portion 94 which, at its upper end, is formed with an inwardly turned flange 96 surrounding the pipe 64. The portion 94 is formed with an external thread adapted to receive a screw plug 98, and a packing 100, conveniently of synthetic rubber, is provided between the plug 98 and the flange 96. The pipe 64 terminates at a certain distance below the plug 98, but in any event so much above the maximum liquid level within the tank 10 that the liquid will never flow into the lower end of the pipe 64. The pipe is vertically positioned by its connection with the plug 89 which, as hereinbefore stated, is suitably a soldered connection.

The pipe 78 is formed with an enlarged screw-threaded portion 102, Fig. 6, fitting into an internal thread in the pipe 64. This enlarged portion is formed with channels 104, Fig. 7, to provide with the annulus 88 a continuous passage from the upper portion of the tank 10 to the annular space 60.

The pipe 78 extends, with an enlarged diameter 77, down through the tank 10 and is at a distance above the bottom of the tank provided with a flange 106 in which is formed a passage or channel 108 extending from the lower side of the flange into the bore 80 of the pipe. The pipe 78 extends through the bottom of the tank 10 which is provided with a socket 111 into which is screwed a bottom plug 110 having a screw-threaded axial bore into which is screwed another plug 112 for clamping a packing 114 against the pipe 78 to seal the bottom aperture of the tank. The packing 114 may consist of synthetic rubber or like material. A sleeve 116 is rigidly connected with the lower end of the pipe 78 and is surrounded by and rigidly connected with another sleeve 118, such as by means of a set screw 120. The spindle 82 extends through the whole length of the pipe 78 and is at its lower end formed with a lug 122. A sleeve 124 and a packing 126 serve to seal the lower end of the pipe 78 around the spindle 82.

A socket 128, Fig. 6, having an inwardly turned flange 130 is screwed on the lower end of a tube 134 surrounding the pipe portion 77. A gasket 132 is clamped between the flange 130 and the lower end of the tube 134. The tube 134 which need not be liquid-tight is near its upper end formed with an internal flange 136, Figure 15, and an external flange 138. Another tube 140 is screwed into the upper end of the tube 134 and is at its upper end formed with an internal flange 142, the aperture of which is large enough to allow for free passage of the lower end of the pipe 64. A packing 144, preferably of synthetic rubber, is provided around the pipe 78 at the upper end of the tube 140 and adapted to engage the lower end of the pipe 64 to seal the same. The gasket 132 is adapted to seal the passage 108 and may consist of fibre or like material. The packing 144 is arranged within a sleeve 146 having an inwardly turned flange 148, the length of this sleeve being so much smaller than the length of the packing 144 that the sleeve will not engage the flange 142, even if the rubber packing 144 is compressed.

A relatively weak coil spring 150 is interposed between the flange 136 of the tube 134 and the flange 148 of the sleeve 146, and another coil spring 152 of somewhat greater power than the spring 150 is interposed between the lower side of the flange 136 and the upper side of the flange 106 on the enlarged portion 77 of the pipe 78. It will thus be obvious that the spring 152 will urge the gasket 132 against the lower side of the flange 106 so as to seal the passage 108, whilst the spring 150 will urge the packing 144 against the lower end of the pipe 64 to seal the same.

A spindle 156 is radially mounted within the tank 10, one end of this spindle being supported by a bracket 154 secured with the tank, e. g. to the plug 92, and the other end of the spindle extending horizontally through a socket 158 in the wall of the tank 10 and being sealed by means of a packing 162 and a screw-threaded sleeve 160. At its inner end the spindle 156 has a cranked portion 164, which is adapted by turning the spindle 156 to engage the flange 138 thereby pressing the tube 134 downwards. An operating handle 168 is secured to the outer end of the spindle as by means of a set screw 166. Obviously, rotation of the spindle 156 by means of the handle 168 will cause the cranked portion 164 of the spindle to cooperate with the flange 138 to displace the tubes 134 and 140 in a downward direction so as to simultaneously open the passage 108 to the inner space 80 of the pipe 78 and the lower end of the pipe 64.

A tube 170 is secured to the sleeve 118 and extends towards the circumference of the tank 10. A rotable knob 172 is mounted at the outer end of the tube 170 and is connected with a flexible spindle 174 mounted within the tube 170. The inner end of the flexible spindle 174 which is supported in the sleeve 118, has a cranked portion 176, and engages the lug 122 at the lower end of the spindle 82. The cranked portion 176 has a stroke of such proportion, that rotation of the knob 172 through 180° will retract the needle 70 completely from the restricted portion 68 of the bore 66 of the nozzle 48.

As hereinbefore stated, the pipes 78 and 64 are rotatably connected with each other by means of the screw thread on the enlarged portion 102 of the pipe 78. Therefore, the plug 62 with the bores 84 at the upper end of the pipe 78 can be moved towards and away from the fixed nozzle 56, to provide for a smaller or greater height of the annular space 60, if the two pipes are adequately rotated relative to each other. Such rotation can be effected by means of the sleeves 116, 118 and the tube 170 mounted thereon which can be moved at right angles to the axis of the pipe 78. Such movement is limited by means of stops 178 mounted on the lower side of the tank 10, only one of these stops being shown in Fig. 1 of the drawing. If, for instance the screw thread of the portion 102 is a right hand thread, rotation of the tube 170 in a counter-clockwise direction, in plan view, will effect a decrease of the height of the annular space 60. The stop 178 is situated as to stop the rotation of the tube 170 at such stage of the proceedings that there will always be provided a passage through the passages or bores 84 of the plug 62 and the annular space 60 to the vaporizer channels 44 and 46. Rotation of the tube 170 in a clockwise direction, in plan view, will produce a corresponding increase of the height of the annular space 60 by the pipe 78 being screwed in a downward direction within the pipe 64. The pitch of the thread of the portion 102 is preferably such that rotation of the tube 170 through 120°, i. e., a movement of the knob 172 between the two legs of the tank 10 will allow a variation of the height of the annular space 60 within the required limits, as hereinafter set forth.

The pipes 78 and 64 forming part of the liquid conduit and of the air conduit, respectively, are mutually connected by means of the screw threads on the exterior of the portion 102 of enlarged diameter on the pipe 78 and the corresponding screw threads in the interior of the pipe 64. The pipe 78 can be rotated by means of the tube 170 by moving it in horizontal plane under the bottom of the tank 10. This movement is made possible, because the sleeve 116 is fixed on the pipe 78 and is connected to the sleeve 118 by means of the set screw 120. The horizontal movement of the tube 170 is limited by the stops 178 under the bottom of the tank. Stop 178 is arranged so as to limit the rotation in the direction in which the pipe 78 is screwed upwardly into the pipe 64, so that the top of the plug 62 will always be at some distance below the bottom of the plug 56, in all positions allowing passage through the annular space 60.

A small bowl 180 is arranged immediately below the vaporizer channels 44, 46 and the nozzle 48. This bowl may either be a separate member, as shown in Fig. 1, or alternatively, as shown in Fig. 13, the bowl may be formed by the annular baffle 54 which, in this instance, is extended downward and formed with a bottom 55, a plurality of apertures 57 being provided at a small distance above the bottom which act as air intake conduits. Alternatively, another member which is capable of holding liquid, such as a porous plate of asbestos or other non-inflammable material may be utilized.

This bowl 180 should not be mistaken for the bowl provided under the vaporizer of usual kerosene stoves and serving to heat the vaporizer by means of alcohol which is burned in the bowl. The bowl 180 of the present apparatus serves a totally different purpose and is mounted at a totally different place, viz. immediately below the nozzle 48, for the reasons set forth hereinafter.

In operation, the handle 168 is so adjusted that the cranked portion 164 of the spindle 156 urges the tubes 134 and 140 downwards against the action of the spring 152, the cranked portion 164 acting upon the flange 138. The spring 150 will, therefore, urge the sleeve 146, having the flange 148, and the packing disposed therein, towards the flange 142, but the cranked portion 164 is so dimensioned that, when the tubes 134 and 140 are depressed, the passage 108 to the interior 80 of the pipe 78 is opened, and the lower end of the pipe 64 is opened whereby there is also opened the annulus 88 between the pipes 64 and 78. At the same time the knob 172, which is suitably provided with an appropriate indication, such as an arrow, is held in the position indicated in Fig. 1, where the spindle 82 with the needle 70 assumes the position shown in Fig. 3 in which the needle 70 closes the outer restricted portion 68 of the nozzle.

When the various parts are in this position, air is pumped into the tank 10 so that an air pressure above the atmosphere is created in the dome-shaped upper portion 28 of the tank. This pressure will have the effect that compressed air is in the annulus 88, the bores 84 and the annular space 60, the vaporizer channels 40—46 and the liquid compartment 36, and that the liquid will be urged through the passage 108 to the pipe 78 and through the riser 34 to the lower portion of the compartment 36 as hereinafter explained.

When the apparatus has been sufficiently inflated (in practice to a pressure of one third to one half atmosphere above atmospheric pressure) the knob 172 is turned until the indicator arrow indicates that the crank 176 of the flexible spindle 174 has retracted the spindle 82 and the needle 70 to open the outer restricted portion 68 of the bore 66 of the plug 56, and at the same time the device is ignited. When the restricted bore 68 is opened at the aforesaid air and liquid pressure, the liquid will rise within the pipe 78 and flow out of the nozzle 48, and at the same time air passes at great velocity through the annulus 88, the bores 84, the annular space 60, and meets at the upper end of the plug 62 with the liquid, whence they both flow through the nozzle 48, whereby the liquid is atomized. There are three pre-heater conduits: an air conduit, a liquid conduit, and an atomizer conduit. The air conduit comprises the dome 28, the annulus 88, the bores 84, the annular space 60, and the vaporizer channels 38, 40, 42, 44 and 46. The liquid conduit comprises the tank 10, the passage 108 and the bores 80 and 73. The atomizer conduit includes the bore 68 in the nozzle 48. The dimensions of the annular space 60 and the diameter and length of the restricted bore portion 68 as well as the bore 73 of the liquid conduit are such that a condition of balance between the escape velocities of the liquid and the air is created in such a manner that an atomization of the liquid takes place in and immediately outside the portion 68, the liquid applying itself as a thin film to the inner wall of the portion 68 and the outflowing air tearing microscopic particles at great velocity through the nozzle. This mixture of air and microscopic fuel droplets burns with an intensely heating flame which heats the vaporizer channels situated above the nozzle.

Applicant has found a new principle for atomization. The conditions must be so that when air and liquid are meeting in the intersection points a stable condition is obtained with the liquid forming a meniscus, from which the particles are blown away in nearly the same manner as a heavy storm blows water from the top of the waves. In order to obtain a stable condition with the meniscus there must be a certain relation between the diameter of the air pipe where it extends into the common outlet, and the diameter and the length of the outlet passage; the meniscus is not only formed at the intersection, but the fluid is drawn from the meniscus along the interior walls of the common outlet, so that the fluid here is also subjected to the action of the air. The fluid surrounds the air as a thin tube within the outlet pipe and fine atomized fluid particles are blown off by the air, which passes with a high velocity.

The advantages of the instant atomizer are that the atomization is much finer than in any prior atomizer with the result that the flame temperature is also much higher. The bore 68 in the nozzle 48 is the outlet passage, and the space 60 is that part of the air pipe or conduit which is rather critical with respect to the cross section of the outlet passage.

The vaporizer channels 38, 40, 42, 44 and 46 being cold when the flame is lighted, some of the kerosene will initially be condensed on the outside of the vaporizer channel structures and flow down the same. This condensed liquid is however collected in the bowl 180 which needs only to be dimensioned to receive one or two cubic centimeters. When the apparatus is started a mixture of fluid and air passes through the nozzle 48. This mixture contains sufficient liquid to allow it to be ignited by a match. The liquid is in the mixture in a finely atomized state. Initially the vaporizer channels are cold and therefore some of the liquid particles will be condensed on the walls of the parts below the nozzle 48 from where the mixture emanates and the exterior. This condensed liquid will run down the vaporizer channel structure and if the bowl 180 were not provided it would run down the exterior of pipe 64 and, further down, float over the top of the tank 28. The bowl 180 serves the purpose of preventing the condensed fluid to run down. Furthermore the bowl has another purpose. It has been found by experience that when the apparatus is lighted a certain amount of liquid will be condensed, running down, and filling the bowl 180. Some of the liquid running down will also settle on the vaporizer channels 44 and 46 around the nozzle 48. Due to the heat of the flame the liquid settling down here will be lighted by the flame with the result that the condensed liquid will start burning also in the bowl. In practice it has been found that the amount of liquid condensed and caught in the bowl will be a measure for how long a time the apparatus should be operated with the preheater, until the vaporizer has been sufficiently preheated. Within a very short time, usually not more than 15–20 seconds, this condensation will have ceased, and at the same time the parts of the vaporizer situated above the nozzle 48 will have been heated. The bowl should be disposed so near the nozzle that the kerosene in the bowl is vaporized by the heat of the flame and is lighted whereby the kerosene will burn with a non-luminous intensely heating flame which contributes to effectively heat the parts of the vaporizer subjected to direct action of the vaporizer flame. In practice, it has been found that the temperature of the vaporizer will have attained the value required for normal operation when the amount of kerosene collected in the bowl 180 has been almost completely burned. Therefore, by observing the bowl it can be ascertained when the apparatus should be set for normal operation. This can usually be effected in the course of 40–50 seconds while the kerosene stoves known heretofore require a heating period of 2 or 3 minutes.

Reversal of the apparatus from the pre-heating condition to normal operating condition is simply effected by turning the handle 168 so that the cranked portion 164 of the spindle 156 releases the flange 138, whereby the tubes 134 and 140 are urged in an upward direction under the action of the spring 152. Hereby the passage 108 is closed, and at the same time the weaker spring 150 urges the sleeve 146, 148 and the packing 144 against the lower end of the pipe 64 to close the same. When these conduits are closed the compressed air within the dome-shaped portion 28 of the tank 10 acts exclusively to urge the liquid through the riser pipe 34, the compartment 36 and the vaporizer channels 38, 40, 44, 46, which by now have been sufficiently heated to allow the apparatus to operate as a usual kerosene stove.

It has been found that changing over of the handle 168 immediately before the last drops of the kerosene in the bowl 180 will have been burned, insures a perfectly smooth change to normal operation, the remaining portion of the flame from the bowl acting as ignition flame for the kerosene vapor now produced in the vaporizer channel. Experiments have shown that the air pressure utilized for the atomization in the nozzle 48 during pre-heating will transmit itself so far through the vaporizer channels into the compartment 36 that, during pre-heating, the liquid within this compartment will not rise higher than about the middle thereof. On the other hand, the changeover to normal operation will, by reason of the sudden closing of the pipes 64 and 78, actually cause the liquid to pass instantly into the vaporizer channel to be vaporized there.

As regards the position of the knob 172 and the tube 170, i. e. the dimension of the annular space 60, it should be pointed out that, when the pre-heating flame is lighted, the knob 172 is preferably moved to abut against the stop 178, which corresponds to the smallest dimension of the annular space 60, i. e. the smallest possible amount of air relative to the amount of liquid flowing through the pipe 78. Hereby the mixture will be rather rich at the moment of lighting and, therefore, easily inflammable. As soon as the flame has been lighted and has burned for a few seconds, the dimension of the annular space 60 and, consequently, the air supply may be increased to produce a more meagre mixture and a higher temperature of the pre-heater flame, by the knob 172 being moved away from the abutment 178.

During normal operation, horizontal displacement of the knob 172 will result in a greater or smaller free area between the vaporizer channels 44, 46 and the nozzle 48, i. e. the knob 172 can during normal operation also be used, as during pre-heating, for adjusting the mixture and, consequently, the temperature of the flame. The apparatus can thus be regulated very exactly almost in the same manner as an ordinary gas stove.

It will also be understood that the size of the kerosene gas flame may, alternatively, be adjusted by turning of the knob 172 within certain limits to bring the upper end of the needle 70 to a position near the restricted channels 68 to partly close the same. The normal function of the needle 70 is to act as cleaning needle, but in the combination described the needle can also act as a regulating means for the size of the flame during normal operation and as a sealing means during inflating of the fuel tank. Furthermore, the needle can be utilized for preventing outflow of kerosene vapors from the vaporizer, when the apparatus is shut off. Shutting off is effected by turning the knob 172 so that the needle is introduced into and closes the bore 68, subsequent to which the operating handle 168 is moved to the starting position so that the liquid pipe 78 and the pipe 64 are opened. Hereby air flows into the pipe 64 and through the vaporizer channels 38—46, whereby it forces the kerosene back through the compartment 36 to the tank. Partly vaporized kerosene contained in the vaporizer channels will condense and the droplets remaining in these channels will, when the air is permitted to escape from the tank by loosening of the screw plug 22, return to the tank through the liquid pipe 78. This prevents the development of soot after the apparatus has been shut off, and furthermore the operation handles will be in the correct position for starting the apparatus.

A modification of the arrangement shown in Figures 1—7 and 15 in connection with a kerosene stove is shown in Figures 8—12 and 14 in connection with a kerosene lamp. In the following, parts similar to those of the previously described embodiment are indicated by similar reference numerals except preceded by the symbol numeral "3". This lamp also comprises a fuel tank 310 have a filler pipe 316 with a screw cap 318 and a closing plug 320, 322 and a pump, the operating handle of which is denoted by 182.

On the upper side of the tank 10 there is provided a cylindrical member 184 having an upper flared portion 186. Vertical rods 188 and 190 are secured near the circumference of the flared portion 186 and are disposed diametrically opposite each other and are adapted to support an annular member 192, in its turn supporting a suitable cap 194. The upper portions of the rods 188, 190 are outwardly cranked, as at 196 and 198, immediately below their connections with the annular member 192. These cranks are engaged by lugs 200, 202 formed at the lower ends of a U-shaped handle 204 for carrying the lamp.

The liquid riser pipe 334 is in the construction shown in Fig. 8 connected with a vertical pipe 206 in spaced parallel relationship to the pipe 364. This pipe 206 terminates, at a certain distance below the nozzle 348 of the pipe 364, in a vaporizer pipe 208 in the form of an open ring arranged co-axially within the upper portion of the lamp. The pipe 208 opens, at its end remote from the pipe 206, into the upper portion of the pipe 64 in a similar manner as the vaporizer pipes 44, 46 in Fig. 1 and Fig. 3. Spaced above the nozzle 348 there is provided an inverted U-shaped pipe 210 one open branch of which is co-axially aligned with the pipe 364 and the other branch of which is co-axially disposed within the lamp and carries a lamp member 212 including an Auer net 214. The lamp member is surrounded by the vaporizer pipe 208 so that, during normal operation, the vaporizer pipe 208 is sufficiently heated to vaporize the kerosene fed thereto through the pipes 334, 206. In order to shield the incandescent portions of the lamp and to maintain a suitable high temperature within the lamp during operation, a glass cylinder 216 is interposed between the flared portion 186 and the member 192.

The nozzle arrangement shown in Figures 8—12 and 14 differs from that shown in Figures 1—5 and 15 in that the nozzle plug 356, instead of being formed with recesses for receiving a special tool for fitting the nozzle within the pipe 364, is formed with a hexagon head of an appropriate smaller diameter than the pipe 364 so that the plug can be fitted by means of an ordinary socket wrench. Also the plug 218 fitted at the upper end of the pipe 378 differs from the plug 62 shown in Figures 1 and 3. The plug 218 is screwed into the pipe 378 and is formed with an enlarged section 220 adapted to engage the walls of the pipe 364 to guide the plug therein and is formed with two flat sides to provide passages 222 for the air from the annulus 388 to the annular space 360 between the adjacent end faces of the plugs 356, 218, the air to the annulus 388 entering through the open lower end of the pipe 364, as will hereinafter be more fully described;

The pipe 364 terminates at its lower end, as is also the case in the construction shown in Figures 1–6 and 15, within the tank 310 above the maximum liquid level therein. As shown in Fig. 8, the pipe 364 extends through a socket 227 which is held against axial displacement and which is sealed around the pipe 364, as by soldering. The socket 227 is at its lower end formed with an external flange 226 having a cylindrical flange 228 near its circumference to position a coil spring 230 which, at its upper end, abuts against the flange 226.

As in Fig. 6, the pipe 364 shown in Fig. 8 is adapted to be sealed at its lower end by means of a packing 3144 mounted within a slidable sleeve 3146, having an inwardly turned flange 3148. This sleeve is mounted within a tube 232 formed at its lower end with a flange 234, which latter has a lateral extension 236 with a bore 238 through which the riser pipe 334 extends. A coil spring 240 arranged within the tube 232 acts to urge the packing 3144 against an internal flange 242 at the upper end of the tube, which flange has an internal diameter which is slightly greater than the external diameter of the pipe 364.

A tubular member 246 surrounding the pipe 78 is arranged under the flange 234 and is rigidly connected therewith. A recess 248, Fig. 12, is formed at one side of the lower end of the member 246, the side walls 250 of the recess being inclined as shown in Fig. 12. The pipe 378 extends in axial alignment with the member 246 through the bottom of the tank 310 through a sealing device of the same construction as that described with reference to Fig. 1. Fixed to and surrounding the pipe 378 is a collar 254 having an upward projection 256. A passage 258 extends from the top of this projection to the inside of the pipe 378, and the passage 258 intersects the pipe 378 at 257, to permit fuel to enter into the pipe 378. This is best shown in Fig. 14. The height of the projection 256 is sufficiently smaller than the depth of the recess 248 so that, when the parts are in the position shown in Fig. 8 in which the projection 256 engages the recess 248, a connection is established through the passage 258 between the interior of the tank 310 and the interior of the pipe 378 and the tube 246.

A socket 260 is fitted at the lower end of the pipe 378 and carries, in like manner as in Fig. 1, the tube 3170 and the knob 3172, spindle 3174, and crank 3176 mounted therein, the crank being connected with the lug 3122 at the lower end of the spindle 382.

A gasket 262 is provided at the lower end face of the tubular member 246 between this member 246 and the collar 254.

While in the arrangement shown in Figures 1–7 a separate operating handle 168 is required for changing over from the pre-heating condition of the apparatus to normal operation, such change-over is, in the construction shown in Figures 8–12 and 14, effected exclusively by means of the knob 3172, the operation being as follows: Before lighting the lamp the knob 3172 is so adjusted that the needle 370 closes the nozzle 348, and furthermore the knob 3172 is displaced to such position that the projection 256 engages the recess 248 at the lower end of the tubular member 246. Thereby, the tubular member 246 is in its lower position, and the passage 248 is uncovered to admit liquid. Thus, liquid can flow through the passage 258 to the interior of the pipe 378 and air can be admitted through the lower end of the pipe 364, the spring 230 urging the tube 232 and the tubular member 246 downwards.

In the starting position of the apparatus, the hollow arm 3170 is swung in horizontal plane to one of its outer positions, which is adjusted so that the cam member 256 is lying in the notch 248. This again means that spring 230 will push the whole structure downwardly. The structure referred to here is as well the part 256 as the part 234 with the packing 3144 and the interior spring 240. The entire length of this structure, namely the distance from the top of the packing 3144 to the bottom of the tube 246 is so adapted to the distance between the surface 256a (see Fig. 14) of the flange 254 and the bottom edge of tube 364 that the packing 3144 will be disengaged from the tube 364 when the spring 230 is pushing the parts down in the position shown in Fig. 14.

Now the tank is inflated and when the pressure therein will have attained a suitable value, the knob 3172 is turned to retract the needle 370 from the nozzle 348 so that the atomization is initiated in the manner described hereinbefore with reference to Figures 1–7. The fuel jet is lighted and the flame passes through the U-shaped tube 210 to the lamp members 212, 214 which are heated and from which the heat transmits itself to the vaporizer 208. The pipes 378 and 364 being connected with each other in the same manner as described with reference to Fig. 6, the pipe 378 having an enlarged screw threaded portion 3102, Fig. 8, fitting into an internal thread in the pipe 364, whereby the air supply during atomization can be adjusted in the manner hereinbefore described. The recess 248 at the lower end of the member 246 is so arranged that, when the knob 3172 is turned in a counter-clockwise direction about the axis of the pipe 378 to minimize the dimension of the space 360 as much as possible to produce a rich mixture, the projection 256 of the collar 254 will engage the recess 248. The inclined faces 250 of the recess 248 are so spaced as to allow a certain rotation of the collar 254 and the pipe 378 relative to the member 246 without the latter being lifted to close the lower end of the pipe 364. In this manner allowance is made for a certain horizontal movement of the knob 3172 to regulate the flame from the atomizer.

When the lamp has been burning for awhile, e. g. for about one minute, with a flame of finely atomized liquid particles produced by the atomization taking place as described hereinbefore in and near the nozzle opening 368, the normal operation of the lamp is initiated by the knob 3172 being turned in a clockwise direction about the axis of the pipe 378. Hereby the projection 256 lifts the tubular member 246 so that the packing 3144, loaded by the spring 240, is urged against the lower end of the pipe 364 to seal off same, at the same time as the passage 258 is closed by the top of the projection 256 being urged against the gasket 262. Hereby the adjustment of the lamp is suddenly reversed, the member 246 is in its upper position, and the passage 258 covered by the gasket 262 and the liquid fuel is now allowed to flow only through the riser 334 and the pipe 206 to the vaporizer pipe 208 and thence through the nozzle 348. The change-over being effected by the time when the vaporizer has been heated to a temperature at which the fuel is vaporized, the further operation will be as in a usual kerosene vapor lamp.

The intensity of the lamp can be regulated by turning the knob 3172 about its own axis to close the nozzle more or less by means of the needle 370.

While the stove shown in Figures 1–7 and 15 is provided with legs, the lamp shown in Fig. 8 is supported upon a ring 270 secured to the tank 310. The tube 3170 extends through a circumferential slot 272 in the ring, the ends of which slot act as abutments to limit horizontal movement of the knob 3172.

In the embodiment described hereinbefore, the horizontal movements of the tube 3170 are limited to the extreme positions in which the lower ends of the pipes 364, 378 are either completely open or completely closed, while adjustments are only made by means of the needle 370.

As will be understood from the foregoing description, the invention includes several novel features as follows:

On one hand it is novel to combine the atomizer pre-heater of a kerosene vapor burner with the fuel nozzle thereof in such a manner that the air required for atomization is also admitted to the vaporizer channels to hold back the liquid fuel fed thereto through the riser pipe, until the burner is sufficiently heated. Furthermore it is novel and, besides, of paramount importance that the atomizer is adjustable to yield a relatively fat mixture for ignition and a relatively meagre mixture for heating. This problem has been solved in a simple and efficient manner by providing for adjustment of the dimension of the annular space. As stated above, this feature is of very great importance since atomzation in such a manner that the air and the liquid are in a condition of equilibrium with each other and the air tears droplets from the surface of the liquid film in the nozzle, requires a special ratio between the dimension of the liquid and air channels for obtaining the best atomization possible. In the atomizer known heretofore it has been necessary to previously compute the dimension of the channels and to make the nozzle with great exactitude for obtaining a given amount of atomized liquid per unit of time and for obtaining a quiet non-sooting flame, even small deviations from the correct dimensions of the channels being capable of impeding the atomization essentially. If, however, the annular air space 60 (360) is capable of variation, as hereinbefore described, the dimensions of the channels will be far less critical since it will always be possible to adjust the dimension of the air channel in such a manner with respect to the dimension of the liquid channel that an optimum is obtained.

In this connection it should be pointed out that the abutment for limiting the horizontal movements of the knob 172 (3172) are so disposed that the air space 60 (360) cannot be completely closed, i. e. the plugs 62 and 56 (362, 356) cannot make contact with each other. This is also advantageous in that it is thus impossible, by inapt operation, to subject the relatively small parts in the interior of the device to excessive stresses. It should further be pointed out that all the parts of the device are so simple that they can be made in mass production and be easily mounted together. In this connection the co-axial operation of the upper end of the atomizer is of special importance.

Also the co-axial arrangement of the pipes 64, 78 (364, 378) and the compartment 36 (Fig. 1) is of substantial importance, this arrangement insuring a certain cooling of the pipes during operation by means of the liquid contained in the compartment.

The novel feature of the invention may also be utilized in connection with other apparatuses than those described utilizing atomized fuel for heating, either preliminary or constantly.

I claim:

1. A burner arrangement for liquid fuel, comprising a fuel tank, means for producing an air pressure above the atmosphere within said fuel tank, an outer pipe opening into the air space within said tank, a burner nozzle at the end of said pipe remote from said tank, said nozzle having a discharge passage, an inner pipe concentrically disposed within said outer pipe in spaced relationship thereto and communicating with the fuel space within said tank, a plug in the end of said inner pipe adjacent said nozzle to form an atomizing space between said plug and said nozzle, passages in said plug constituting communication between the interior of said inner and outer pipes with said atomizing space, member means mounted for sliding movement on a portion of said inner pipe projecting axially from said outer pipe, sealing means on said member means movable therewith and operable simultaneously to close the connections of said outer and inner pipes with said tank, manually operable means for effecting sliding movement of said member means, a fuel vaporizer adapted to be heated by the flame from said burner nozzle, means for independently supplying fuel from said tank to said vaporizer, said vaporizer having its discharge branched into the interior of said outer pipe adjacent said nozzle.

2. A burner arrangement for liquid fuel, comprising a fuel tank, means for producing an air pressure above the atmosphere within said fuel tank, an outer pipe having an opening communicating with the air space within said tank, a burner nozzle at the end of said pipe remote from said tank, said nozzle having a discharge passage, an inner pipe concentrically disposed within said outer pipe in spaced relationship thereto, and extending through said fuel tank to project therefrom at one end, means closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, a passage in said inner pipe constituting communication between the interior of such pipe and the fuel space of said tank, a plug in the end of said inner pipe adjacent said nozzle to form an atomizing space between said plug and said nozzle, passages in said plug constituting communication between the interior of said inner and outer pipes with said atomizing space, member means mounted for sliding movement on the portion of said inner pipe extending through said fuel tank, a pair of sealing means on said member means movable therewith and operable to simultaneously seal the opening of said outer pipe and the passage of said inner pipe in one position of said member, manually operable means for effecting sliding movement of said member means, a fuel vaporizer adapted to be heated by the flame from said burner nozzle, means for independently supplying fuel from said tank to said vaporizer, said vaporizer having its discharge branched into the interior of said outer pipe adjacent said nozzle.

3. A device as in claim 2, wherein a portion of the passage constituting communcation between the interior of said inner pipe and the fuel space of said tank is formed in a flange on said inner pipe with an end on the face of the flange remote from the opening of said outer pipe.

4. A burner arrangement for liquid fuel, comprising a fuel tank, means for producing an air pressure above the atmosphere within said fuel tank, an outer pipe having an opening communicating with the air space within said tank, a burner nozzle at the end of said pipe remote from said tank, said burner nozzle having a discharge passage, an inner pipe concentrically disposed within said outer pipe in spaced relationship thereto, and extending through said fuel tank to project therefrom at one end, means closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, a flange on the portion of said inner pipe situated in the fuel space of said tank, a passage partially formed in said flange constituting communication between said fuel space and the interior of said inner pipe and having an end on the face of the flange remote from the opening of said outer pipe, a plug in the end of said inner pipe adjacent said nozzle to form an atomizing space between said plug and said nozzle, passages in said plug constituting communication between the interior of said inner and outer pipes with said atomizing space member means mounted for sliding movement on the portion of said inner pipe extending through said fuel tank, a pair of sealing means on said member means movable therewith and operable to simultaneously seal the said opening of said outer pipe and the passage in the flange of said inner pipe in one position of said member means, means resiliently spacing said pair of sealing means slightly more than the distance between the said opening of said outer pipe and said end of the passage in the flange of said inner pipe, manually operable means for effecting sliding movement of said member means, a fuel vaporizer adapted to be heated by the flame from said burner nozzle, means for independently supplying fuel from said tank to said vaporizer, said vaporizer having its discharge branched into the interior of said outer pipe adjacent said nozzle.

5. A device as in claim 4, comprising cam means operable for determining the maximum distance between said pair of sealing means.

6. A burner arrangement for liquid fuel, comprising a fuel tank, means for producing an air pressure above the atmosphere within said fuel tank, an outer pipe having an opening communicating with the air space within said tank, a burner nozzle at the end of said pipe remote from said tank, said burner nozzle having a discharge passage, an inner pipe concentrically disposed within said outer pipe in spaced relationship thereto and extending through said fuel tank to project therefrom at one end, means closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, a passage in said inner pipe constituting communication between the interior of such pipe and the fuel space of said tank, a plug in the end of said inner pipe adjacent said nozzle to form an atomizing space between said nozzle and said plug, passages in said plug constituting communication between the interior of said inner pipe and the interior of said outer pipes with said atomizing space, member means mounted for sliding movement on the portion of said inner pipe extending through said fuel tank, a pair of sealing means on said member means movable therewith and operable to simultaneously seal the said opening of said outer pipe and the passage in said inner pipe in one position of said member, resilient means urging said member means to seal the mouth of said outer pipe and the passage of said inner pipe, manually operable means for displacing said member means against the action of said resilient means, a fuel vaporizer adapted to be heated by the flame from said burner nozzle, means for independently supplying fuel from said tank to said vaporizer, said vaporizer having its discharge branched into the interior of said outer pipe adjacent said nozzle.

7. A burner arrangement for liquid fuel, comprising a fuel tank, means for producing an air pressure above the atmosphere within said fuel tank, an outer pipe having an opening for communication with the air space within said tank, a burner nozzle at the end of said pipe remote from said tank, said burner nozzle having a discharge passage, an inner pipe concentrically disposed within said outer pipe in spaced relationship thereto and extending through said fuel tank to project therefrom at one end, means closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, a flange on the portion of said inner pipe situated in the fuel space of said tank, a passage partially formed in said flange constituting communication between said fuel space and the interior of said inner pipe and terminating on the face of the flange remote from the opening of said outer pipe, a plug in the end of said inner pipe adjacent said nozzle to form an atomizing space between said nozzle and said plug, passages in said plug constituting communication between the interior of said inner and outer pipes with said atomizing space, a tubular member mounted for sliding movement on the portion of said inner pipe extending through said fuel tank, an internal flange at one end of said tubular member adapted to seal said passage in the flange of said inner pipe, a sealing member resiliently mounted at the opposite end of said tubular member and adapted to seal the opening of said outer pipe, resilient means urging said tubular member to seal the opening of said outer pipe and the passage in the flange of said inner flange, manually operable means for displacing said member against the action of said resilient means, a fuel vaporizer adapted to be heated by the flame from said burner nozzle, means for independently supplying fuel from said tank to said vaporizer, said vaporizer having its outlet branched into the interior of said outer pipe adjacent said nozzle.

8. A burner arrangement for liquid fuel, comprising a fuel tank, means for producing an air pressure above the atmosphere within said fuel tank, an outer pipe having an opening communicating with the air space within said tank, a burner nozzle at the end of said pipe remote from said tank, said nozzle having a discharge passage, an inner pipe concentrically disposed within said outer pipe in spaced relationship thereto, and extending through said fuel tank to project therefrom at one end, means closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, a passage in said inner pipe constituting communication between the interior of such pipe and the fuel space of said tank, a plug in the end of said inner pipe adjacent said nozzle to form an atomizing space between said nozzle and said plug, passages in said plug constituting communication between the interior of said inner and outer pipes with said atomizing space, member means mounted for sliding movement on the portion of said inner pipe extending through said fuel tank, a pair of sealing means on said member means movable therewith and operable to simultaneously seal the opening of said outer pipe and the passage in said inner pipe in one position of said member means, resilient means urging said member means to effect such sealing, a spindle mounted for rotation within said tank and projecting at one end through the wall thereof, a handling means associated with said projecting end, means associated with said spindle within said tank and adapted to co-operate with said slidable member means to displace the same against the action of said resilient means, a fuel vaporizer adapted to be heated by the flame from said burner nozzle, means for independently supplying fuel from said tank to said vaporizer, said vaporizer having its outlet branched into the interior of said outer pipe adjacent said nozzle.

9. A burner arrangement for liquid fuel, comprising a fuel tank, means for producing an air pressure above the atmosphere within said fuel tank, an outer pipe having an opening communicating with the air space within said tank, a burner nozzle at the end of said pipe remote from said tank, said nozzle having a discharge passage, an inner pipe concentrically disposed within said outer pipe in spaced relationship thereto, and extending through said fuel tank to project therefrom at one end, means for closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, said manually operable means including a lever associated with the projecting end of said inner pipe, abutments for limiting swivelling movement of said lever, a passage in said inner pipe constituting communication between the interior of such pipe and the fuel space of said tank, a plug in the end of said inner pipe adjacent said nozzle to form an atomizing space between said nozzle and said plug, passages in said plug constituting communication between the interior of said inner and outer pipes with said atomizing space, member means mounted for sliding movement on the portion of said inner pipe extending through said fuel tank, a pair of sealing means on said member means movable therewith and operable to simultaneously seal the opening of said outer pipe and the passage in said inner pipe in one position of said member means, manually operable means for effecting sliding movement of said member means, a fuel vaporizer adapted to be heated by the flame from said burner nozzle, means for independently supplying fuel from said tank to said vaporizer, said vaporizer having its outlet branched into the interior of said outer pipe adjacent said nozzle.

10. A burner arrangement for liquid fuel, comprising a fuel tank, means for producing an air pressure above the atmosphere within said fuel tank, an outer pipe having an opening communicating with the air space within said tank, a burner nozzle at the end of said pipe remote from said tank, said burner nozzle having a discharge passage, an inner pipe concentrically disposed within said outer pipe in spaced relationship thereto, a plug at the end of said inner pipe adjacent said nozzle to form an atomizing space between said nozzle and said plug, passages in said plug forming communication between the interior of said inner and outer pipes with said atomizing space, said inner pipe extending through said fuel tank to project therefrom at one end, means closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, member means mounted for sliding movement on the portion of said inner pipe extending through said fuel tank, a sealing means resiliently mounted at one end of said member means and adapted to seal the opening of said outer pipe, means for holding said slidable member means against rotation, a collar having a projection associated with said inner pipe and adapted to co-operate with the end of said slidable member means remote from said sealing means to axially displace said slidable member means, resilient means urging said slidable member means against said projection, a recess in said slidable member means adapted to be engaged by said projection so as to leave the top of said projection free, a passage in said projection having its mouth on the top thereof and communicating with the interior of said inner pipe, said slidable member means being adapted to seal said passage when lifted to seal the opening of said outer pipe by rotation of said inner pipe and said projection to a position out of register with said recess, a fuel vaporizer adapted to be heated by the flame from said burner nozzle, means for independently supplying fuel from said tank to said vaporizer, said vaporizer having its outlet branched into the interior of said outer pipe adjacent said nozzle.

11. A burner arrangement for liquid fuel, comprising a fuel tank, means for producing an air pressure above the atmosphere within said fuel tank, an outer pipe having an opening communicating with the air space within said tank, a burner nozzle at the end of said pipe remote from said tank, said nozzle having a discharge passage, an inner pipe concentrically disposed within said outer pipe in spaced relationship thereto, a plug at the end of said inner pipe adjacent said nozzle to form an atomizing space between said nozzle and said plug, passages in said plug forming communication between the interior of said inner and outer pipes with said atomizing space, said inner pipe extending through said fuel tank to project therefrom at one end, means closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, member means mounted for sliding movement on the portion of said inner pipe extending through said fuel tank, a sealing means resiliently mounted at one end of said member means and adapted to seal the opening of said outer pipe, means for holding said slidable member means against rotation, a collar having a projection associated with said inner pipe and adapted to co-operate with the end of said slidable member means remote from said sealing means to axially displace said slidable member means, resilient means urging said slidable member means against said projection, a recess in said slidable member means adapted to be engaged by said projection so as to leave the top of said projection free, a passage in said projection having an end on the top thereof and communicating with the interior of said inner pipe, said slidable member means being adapted to seal said passage when lifted to seal the opening of said outer pipe by rotation of said inner pipe and said projection to a position out of register with said recess, the arrangement being such that rotation of said inner pipe in a direction to cause said slidable member means to seal the passage in said projection and the opening of said outer pipe acts to retract said plug of said inner pipe from said nozzle, a fuel vaporizer adapted to be heated by the flame from said burner nozzle, means for independently supplying fuel from said tank to said vaporizer, said vaporizer having its outlet branched into the interior of said outer pipe adjacent said nozzle.

12. A device as in claim 11, in which the said recess is formed with sufficient play so as to allow a certain rotation of said inner pipe before said projection commences to act on said slidable member means to cause the same to seal said orifice of said inner pipe and the opening of said outer pipe.

13. A burner arrangement for liquid fuel, comprising a fuel tank, means for producing an air pressure above the atmosphere within said fuel tank, an outer pipe opening into the air space within said tank, a burner nozzle at the end of said pipe remote from said tank, said burner nozzle having a discharge passage, an inner pipe concentrically disposed within said outer pipe in spaced relationship thereto, and extending through said fuel tank to project therefrom at one end, means closing said projecting end of said inner pipe, an external thread on said inner pipe engaging an internal thread in said outer pipe, manually operable means on the projecting end of said inner pipe for rotating the same relative to said outer pipe to adjust it axially within said outer pipe, a passage in said inner pipe constituting communication between the interior of such pipe and the fuel space of said tank, a plug in the end of said inner pipe adjacent said nozzle to form an atomizing space between said nozzle and said plug, a liquid passage in said plug in axial alignment with said discharge passage and of greater diameter than the same forming communication between the interior of said inner pipe and said atomizing space, and an air passage in said plug forming communication between the interior of said outer pipe with said atomizing space, a spindle mounted for sliding movement within said inner pipe and extending liquid-tight through the projecting end thereof, a needle associated with the end of said spindle adjacent said plug and adapted to project through said orifice of said plug, means connected with the end of said spindle projecting from said inner pipe for lengthwise displacement of said spindle to introduce said needle into said discharge passage to obstruct the same and to retract said needle from such passage, member means mounted for sliding movement on the portion of said inner pipe extending through said fuel tank, a pair of sealing means on said member means movable therewith and operable to simultaneously seal the mouth of said outer pipe and the passage in said inner pipe in one position of said member means, manually operable means for effecting sliding movement of said member means, a fuel vaporizer adapted to be heated by the flame from said burner nozzle, means for independently supplying fuel from said tank to said vaporizer, said vaporizer having its outlet branched into the interior of said outer pipe adjacent said nozzle.

14. A device as in claim 13, in which the said means for lengthwise displacement of said spindle comprises a rotatable cranked spindle connected with the projecting end of said slidable spindle.

15. A device as in claim 13, in which the said means for lengthwise displacement of said spindle comprises a rotatable cranked spindle connected with the projecting end of said slidable spindle and mounted in said manually operable means for rotating said inner pipe.

16. In an apparatus for selectively burning atomized liquid fuel for preheating purposes and vaporized liquid fuel during normal operation, an atomizer burner having a system of intersecting air and liquid passages and including movable means for varying the section of said air passage at its point of intersection with said liquid passage, a vaporizer having a connection from the output thereof branched into said system of passages, slidable means including a cleaning needle for cleaning and controlling the outlet of said burner, a rotatable operating arm operatively associated with said movable means for the adjustment thereof, and an operating member mounted on said operating arm for independent rotation about an axis substantially longitudinal of said arm and operatively associated with said slidable means for the operation thereof.

17. In an apparatus for selectively burning atomized liquid fuel for preheating purposes and vaporized liquid fuel during normal operation, an atomizer burner having a system of intersecting air and liquid passages and including movable means for varying the section of said air passage at its point of intersection with said liquid passage, a vaporizer interconnected to a source of fuel supply and having a connection from the output thereof branched into said system of passages, slidable means including a cleaning needle for cleaning and controlling the outlet of said burner, an operating arm rotatable within a limited angular range and operatively associated with the said movable means for the adjustment thereof, and means operable by said operating arm within part of said angular range to simultaneously close the air and liquid supplies to said air and liquid passages.

18. In an apparatus for selectively burning atomized liquid fuel for preheating purposes and vaporized liquid fuel during normal operation, an atomizer burner having a system of intersecting air and liquid passages and including movable means for varying the section of said air passage at its point of intersection with said liquid passage, a vaporizer having a connection from the output thereof branched into said system of passages, slidable means including a cleaning needle for cleaning and controlling the outlet of said burner, an operating arm rotatable within a limited angular range and operatively associated with the said movable means for the adjustment thereof, means operable by said operating arm within part of said angular range to simultaneously close the air and liquid supplies to said air and liquid passages, and an operating member mounted on said operating arm for independent rotation about an axis substantially longitudinal of said arm and operatively associated with said slidable means for the operation thereof.

19. An apparatus for burning liquid fuel in a vaporized state, comprising in combination, a burner operable for selectively burning atomized fuel for preheating purposes and vaporized fuel during normal operation, a vaporizer positioned to be heated by a flame from said burner, a bowl member positioned under said vaporizer and operable to receive temporarily liquid condensed on said vaporizer during preheating thereof by said burner acting as an atomizer, and an outer baffle integral with said bowl member and surrounding said vaporizer and having its upper edge spaced from said vaporizer.

MARTIN GEORG ANDERSEN.

References Cited in the file of this patent

UNITED STATES PATENTS

| Number | Name | Date |
| --- | --- | --- |
| 441,467 | Bray | Nov. 25, 1890 |
| 496,450 | Shedlock | May 2, 1893 |
| 575,979 | Ostlund et al. | Jan. 26, 1897 |
| 631,792 | Hoppe | Aug. 29, 1899 |
| 694,173 | Newbold | Feb. 25, 1902 |
| 971,019 | Cappon et al. | Sept. 27, 1910 |
| 1,005,640 | Gardner | Oct. 10, 1911 |
| 1,337,498 | Alsberg | Apr. 20, 1920 |
| 1,440,725 | Eriksson | Jan. 2, 1923 |
| 1,910,163 | Hogan | May 23, 1933 |
| 2,285,689 | Tullis | June 9, 1942 |
| 2,321,034 | Lieber | June 8, 1943 |
| 2,363,098 | Tullis | Nov. 21, 1944 |
| 2,375,886 | Baker et al. | May 15, 1945 |

FOREIGN PATENTS

| Number | Country | Date |
| --- | --- | --- |
| 37,944 | Switzerland | Sept. 4, 1911 |
| 38,778 | Switzerland | Jan. 23, 1913 |
| 14,533 | Great Britain | of 1914 |
| 467,751 | France | Apr. 4, 1914 |
| 280,868 | Germany | Dec. 1, 1914 |
| 781,409 | France | Feb. 25, 1935 |
| 458,632 | Great Britain | Dec. 23, 1936 |
| 97,524 | Switzerland | Dec. 5, 1939 |
| 109,824 | Australia | Feb. 14, 1940 |